United States Patent
Graham

(10) Patent No.: US 7,557,694 B1
(45) Date of Patent: Jul. 7, 2009

(54) VEHICLE TIRE TREAD DEPTH DETERMINING SYSTEM

(76) Inventor: Jeannell Graham, 3107 Federal House Ct., Waldorf, MD (US) 20602

( * ) Notice: Subject to any disclaimer, the term of this patent is extended or adjusted under 35 U.S.C. 154(b) by 387 days.

(21) Appl. No.: 11/496,077

(22) Filed: Jul. 31, 2006

Related U.S. Application Data

(60) Provisional application No. 60/704,153, filed on Aug. 1, 2005.

(51) Int. Cl.
*B60Q 1/00* (2006.01)
(52) U.S. Cl. ........................ 340/438; 340/442
(58) Field of Classification Search .......... 340/438, 340/442; 362/500; 152/151, 154.2, 209.1, 152/450, 523
See application file for complete search history.

(56) References Cited

U.S. PATENT DOCUMENTS

| | | | |
|---|---|---|---|
| 4,226,274 A | 10/1980 | Awaya et al. | |
| 5,303,756 A | 4/1994 | Hill | |
| 6,220,199 B1 * | 4/2001 | Williams | 116/208 |
| 6,298,889 B1 | 10/2001 | Smith | |
| 7,391,306 B2 * | 6/2008 | Dufournier | 340/442 |

* cited by examiner

*Primary Examiner*—Toan N Pham
*Assistant Examiner*—Kerri L McNally

(57) ABSTRACT

A vehicle tire tread depth determining system includes an annular member embedded beneath an outer surface, and disposed beneath a tread layer, of a vehicle tire. The member has photo-chromatic properties that change color when exposed to ultraviolet light. The member also has a body extending inside an outer perimeter of a tire, and is spaced from the tread layer and formed therewith. A color determining mechanism is in visual communication with the member. A time period mechanism determines when the member has transgressed from a first color to a second color. A display screen is mounted on the dashboard, and includes a graphical user interface and a pictorial illustration of the member color. A controller is housed within a compartment of the vehicle and positioned on a dashboard. A tread depth determining mechanism is spaced from the tire and electrically coupled to a battery and an ignition controller.

9 Claims, 6 Drawing Sheets

VEHICLE TIRE TREAD DEPTH DETERMINING SYSTEM

CROSS REFERENCE TO RELATED APPLICATIONS

This application claims the benefit of U.S. Provisional Application No. 60/704,153, filed Aug. 1, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to tire depth determining systems and, more particularly, to a vehicle tire tread depth determining system for warning a driver of low tread depth on a vehicle tire.

2. Prior Art

Pneumatic vehicle tires essentially consist of a tire carcass, which consists of plies of rubberized fabric, and tread rubber, which surrounds the exterior surface of the carcass. In belted tires, additional layers of fiber glass, steel, or aramid are placed between the plies and the tread rubber. During manufacture, the tire is vulcanized to gain its final shape and strength characteristics. Besides equalizing the stresses within the tire body, the vulcanization changes the rubber compound into a tough, highly elastic material and bonds the parts of the tire into one integral unit.

During the vulcanization process, the tread rubber is molded to form the tire treads which provide frictional engagement between the tire and the road surface. The treads also protect the tire carcass from foreign obstacles on the road surface which could damage the carcass. Since the effectiveness of the tire tread as a cushioning and protective sheath is dependent upon the amount of tread rubber covering the carcass, this effectiveness is decreased as the treads are reduced by wear. If the tire is not routinely inspected, the tread may be worn down to a level where driving becomes dangerous.

One prior art example shows a tire with a layer of a colored material embedded in the tread rubber to visually indicate the degree of tread wear. The tire includes positioning plies having colored fibers at different tread depths to visually indicate when the tread has been worn to the point at which the tread should be recapped or the tire replaced. A second prior art example shows a tire having a sub-surface tread portion of a color contrasting to the outer portion of the tread to indicate when the tread is worn. Another prior art example shows a tire with a colored indicating means embedded within the tread portion of a tire. In this case, the indicating means is preferably made from rubber, metal, or plastic.

Problems have arisen in connection with the above-described colored tread wear indicators in that the coloring in the indicators degrades under the high temperature of vulcanization. Moreover, in instances when the colored material is formed from plastic, the colored material may not sufficiently adhere to the tread rubber. Consequently, after the tire cools following vulcanization, air pockets may remain between the plastic tread wear indicators and the tread rubber, thereby reducing the integrity of the tire.

Accordingly, a need remains for a vehicle tire tread depth determining system in order to overcome the above-noted shortcomings. The present invention satisfies such a need by providing a system that is convenient and easy to use, is lightweight yet durable in design, and provides an easy and effective means of notifying a driver that a tire is excessively worn and should be replaced. Such a system is advantageously enclosed in a sturdy casing that is effectively embedded in the tire tread. When exposed to the ground surface, the system conveniently shows a yellow strip on the worn tire, effectively indicating that a new tire is needed. The system includes an effective visual alert system conveniently mounted on the dashboard of the vehicle, thus advantageously providing a lighted indicator of tire tread status that is visible while driving the car. The significantly and effectively decreases the risk of injuries or fatalities that result from motorists driving on worn or bald tires, thus advantageously helping to keep roadways safe while driving.

BRIEF SUMMARY OF THE INVENTION

In view of the foregoing background, it is therefore an object of the present invention to provide a vehicle tire tread depth determining system. These and other objects, features, and advantages of the invention are provided by a vehicle tire wear notification system for warning a driver of low tread depth on the vehicle tires.

The depth measuring system conveniently includes an annular member advantageously embedded beneath an outer surface of the vehicle tire. Such an annular member is conveniently disposed beneath a tread layer of the vehicle tire such that the annular member is effectively prohibited from being exposed to ambient light when the tread layer has a predetermined minimum thickness. The annular member may have photo-chromatic or thermo-chromatic properties such that the annular member advantageously changes color when exposed to ambient light, thus indicating when the tire tread is worn. The annular member has a single and continuous body extending inside an outer perimeter of the vehicle tire. The annular member is equidistantly spaced from the tread layer and monolithically formed with the vehicle tire.

The system includes a mechanism for determining a color of the annular member. The color determining mechanism is in visual communication with the annular member. The system also includes a mechanism for determining a time period after which the annular member has transgressed from a first color to a second color. The system further includes a display screen mounted on the dashboard. Such a display screen includes a graphical user interface that graphically illustrates a location of the vehicle tire as well as a convenient pictorial illustration of the annular member color.

The system has a controller advantageously housed within a compartment of the vehicle and conveniently positioned on a dashboard of the vehicle so that the driver can visually monitor the controller. Such a controller includes a mechanism for determining a remaining tread depth on the vehicle tire based upon the first color of the annular member and the time period. The tread depth determining mechanism is effectively spaced from the vehicle tire and electrically coupled to a battery of the vehicle and an ignition controller of the vehicle. The tread depth determining mechanism effectively interrupts power between the vehicle battery and ignition controller respectively, when the annular member has color properties exceeding at least one of a threshold color level and a threshold time period respectively.

The system preferably includes a convenient color determining mechanism that includes an optical sensor visually and effectively cooperating with the annular member. Such an optical sensor is coupled directly to the vehicle tire and advantageously maintains a direct line of sight with the annular member. The optical sensor effectively generates and transmits an analog notification signal based upon a color change of the annular member. Such an analog notification signal advantageously has a first data stream that identifies a location of the vehicle tire and a second data stream that identifies the color of the annular member.

The system may include a time period determining mechanism that includes a timer circuit electrically coupled to the optical sensor. Such a timer circuit advantageously triggers an internal counter when the first color changes to the second color. The timer circuit effectively generates and transmits a timing data stream to the optical sensor.

The system may further include a tread depth determining mechanism that conveniently includes an analog-to-digital converter that effectively receives and converts the analog notification signal to a digital notification signal. A digital signal processor is electrically coupled to such an analog-to-digital converter and receives the digital notification signal. A convenient database contains a table of corresponding tread depths, annular member colors and time periods that correspond to a predetermined model of the vehicle tire. A memory electrically coupled to the digital signal processor conveniently includes software instructions that cause the tire wear notification system to effectively determine the tread depth of the vehicle tire based upon the color of the annular member and the time period associated therewith.

Such software instructions include and calculate a logic algorithm including the steps of: retrieving the first color of the annular member; retrieving the time period associated with the first color; if the time period is less than a predetermined threshold time period, locating a tread depth value corresponding to the first color and the time period from the database; and if the time period is greater than the predetermined threshold time period, locating a tread depth value corresponding with the second color and a new time period set to zero.

The system may still further include a power interrupt switch advantageously seated between the vehicle battery and the ignition controller of the vehicle. Such a power interrupt switch is electrically coupled to the digital signal processor and is toggled between open and closed positions when the tread depth falls below the minimum tread depth.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
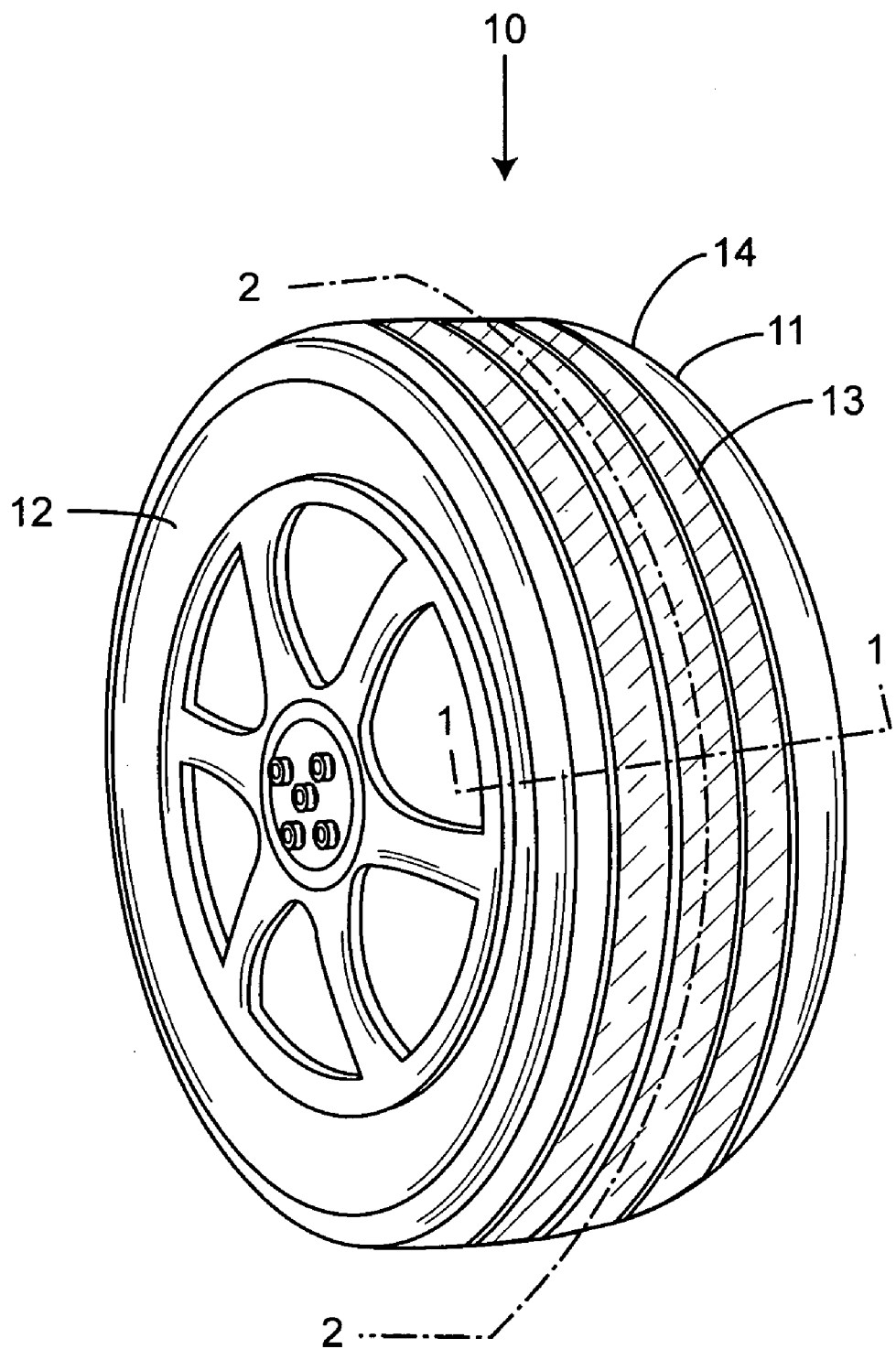
FIG. 1 is a perspective view showing a vehicle tire having an annular member embedded therebeneath, in accordance with the present invention.
Figure 2:
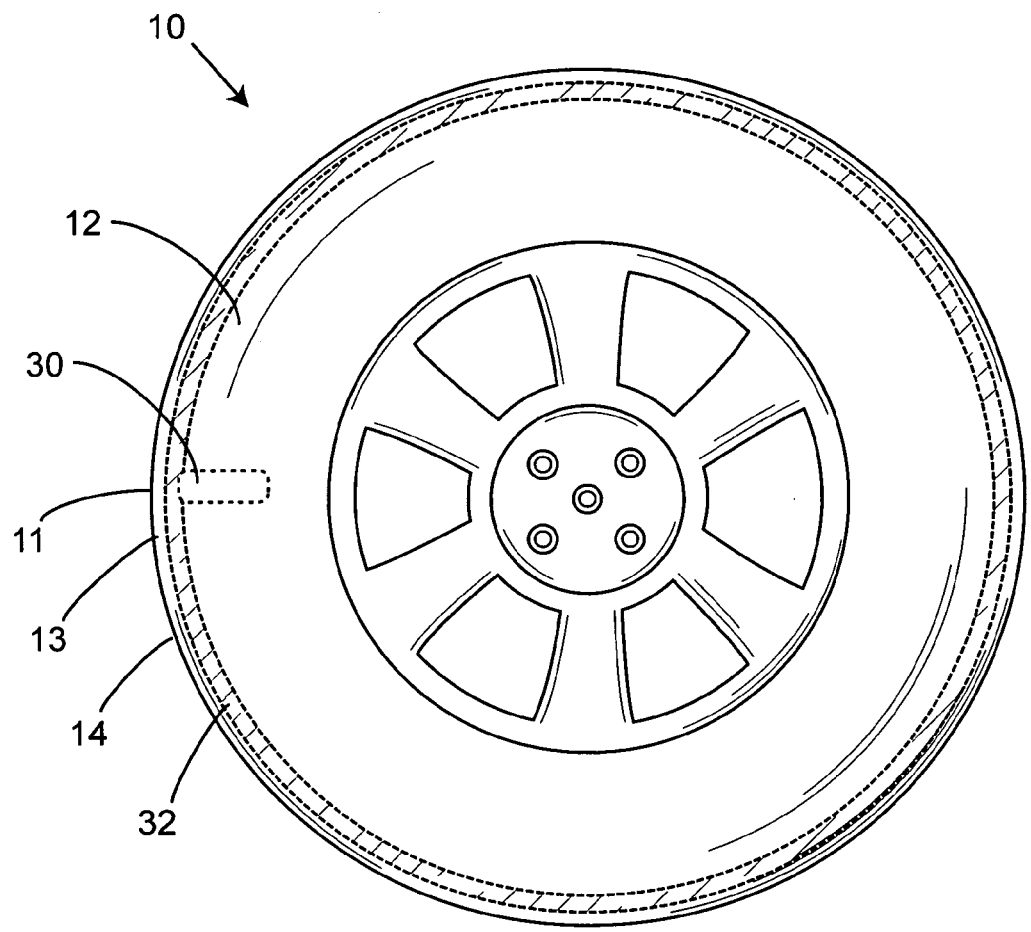
FIG. 2 is a side-elevational view of the system shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-6 by the reference numeral 10 and is intended to provide a vehicle tire tread depth determining system. It should be understood that the system 10 may be used to determine the depth of tread of many different types of tires and should not be limited in use to determining the tread depth of only automobile tires.

Referring initially to FIGS. 1, 2, 4, 5, and 6, the system 10 includes an annular member 30 advantageously embedded beneath an outer surface 11 of the vehicle tire 12. Such an annular member 30 is conveniently disposed beneath a tread layer 13 of the vehicle tire 12 such that the annular member 30 is effectively prohibited from being exposed to ambient ultraviolet light when the tread layer 13 has a predetermined minimum thickness. The annular member 30 has photo-chromatic properties such that the annular member 30 advantageously changes color when exposed to ambient light, which is vital to effectively indicating when the tread layer 13 is worn. The annular member 30 has a single and continuous body 31 extending inside an outer perimeter 14 of the vehicle tire 12. The annular member 30 is equidistantly spaced from the tread layer 13 and monolithically formed with the vehicle tire 12.

Referring to FIGS. 1, 2, 3, 4, 5, and 6, the system 10 includes a convenient mechanism 32 for determining a color of the annular member 30. As an example, the annular member may employ DynaColor™ photochromic inks that are invisible until they come into contact with UV light, like sunlight. When photochromic ink is exposed to UV light, it blooms into color. With photochromics, the present invention does not need a special technique to hide the annular member because the annular member may be colorless until you take it into the sun or expose it to UV light, i.e. when the tire tread has worn down beyond a minimum threshold. The color determining mechanism 32 is in visual communication with the annular member 30. Alternately, the annular member may employ thermochromatic properties such as DynaColor™ thermochromic inks that will change color as their temperature changes. These color-changing inks all work the same way: below the activation temperature they are colored and above the activation temperature they are clear or lightly colored. As the ink cools, the original color returns.

The system 10 also conveniently includes a mechanism 33 for determining a time period after which the annular member 30 has transgressed from a first color to a second color. The system 10 further includes a display screen 34 conveniently mounted on the dashboard 15. Such a display screen 34 includes a graphical user interface 35 that graphically illustrates a location of the vehicle tire 12 as well as a convenient pictorial illustration of the annular member color. Of course, many different colors can be used for the annular member, as is obvious to a person of ordinary skill in the art.

Figure 3:
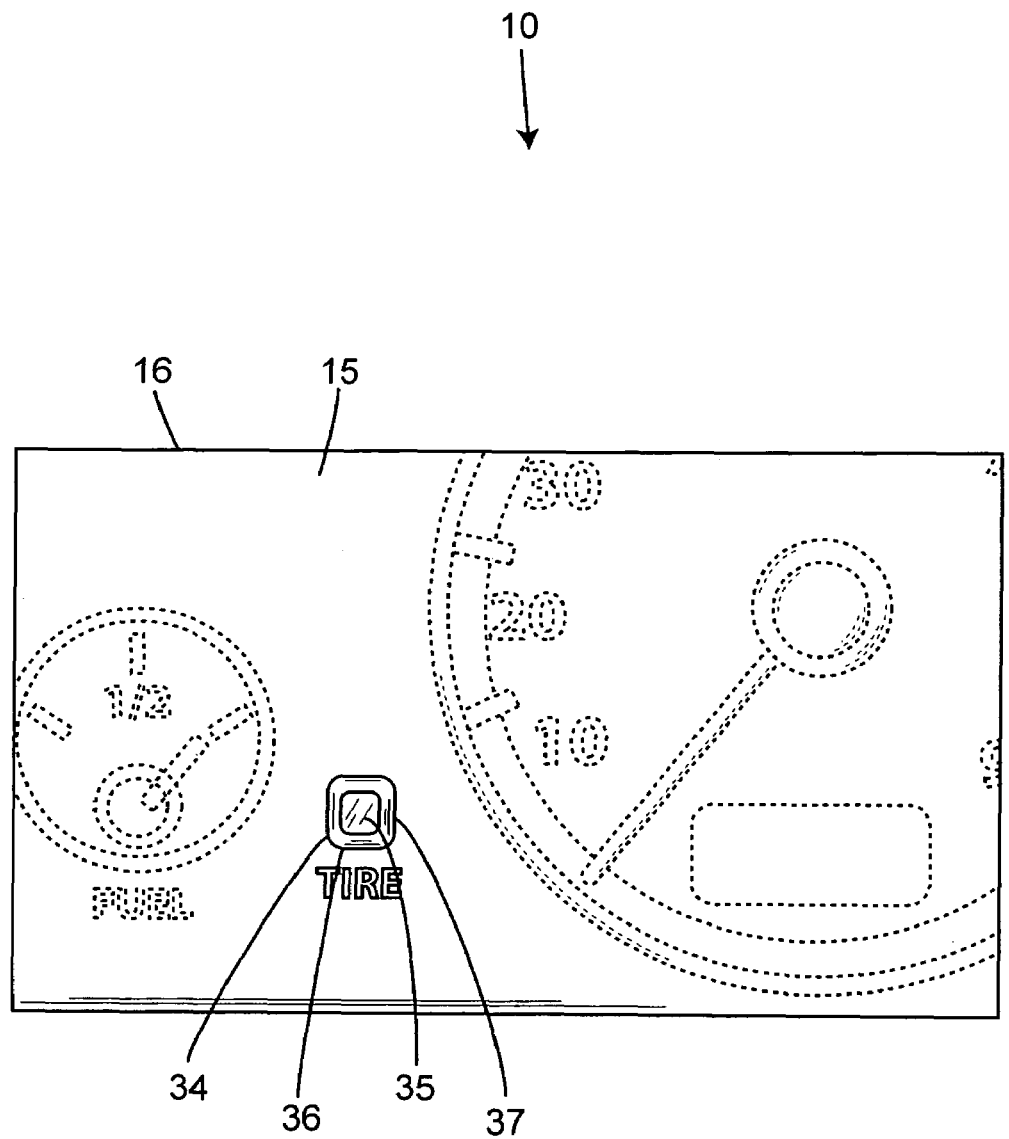
FIG. 3 is a front-elevational view of the dashboard showing the display button, in accordance with the present invention.
Figure 4:
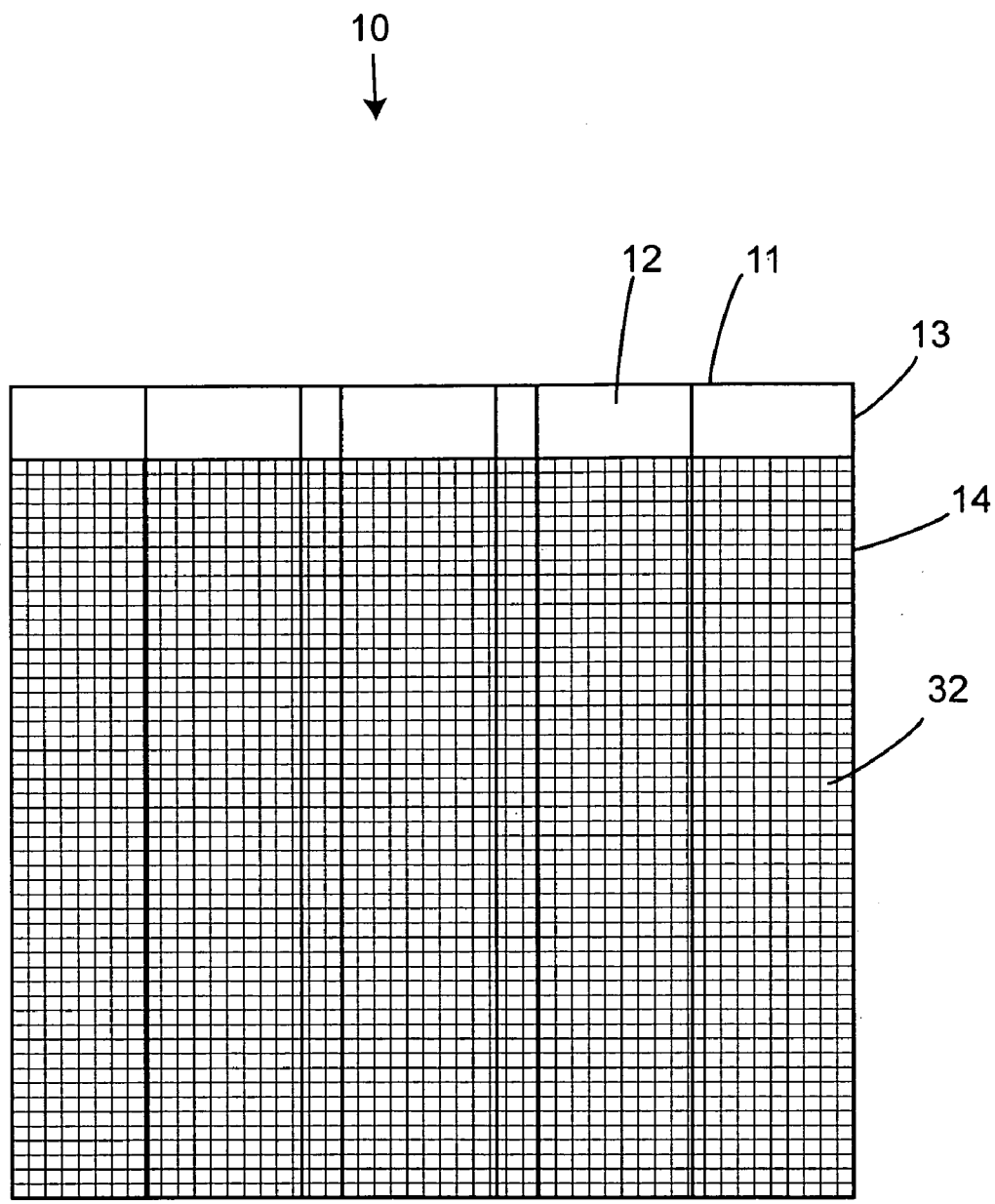
FIG. 4 is a cross-sectional view of the vehicle tire and annular member shown in FIG. 1, taken along line 1-1.
Figure 5:
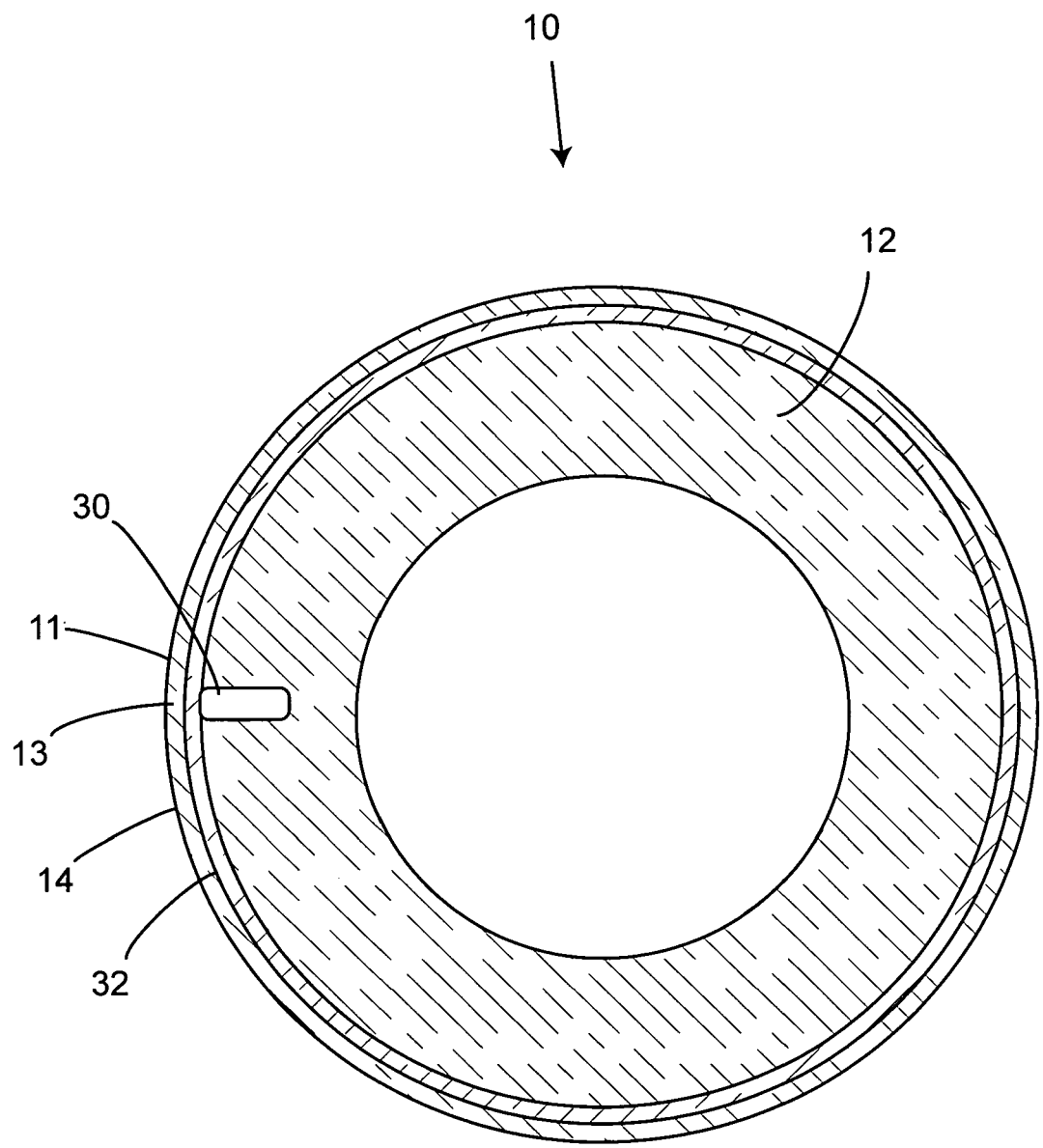
FIG. 5 is a cross-sectional view of the vehicle tire shown in FIG. 1 taken along line 2-2.
Figure 6:
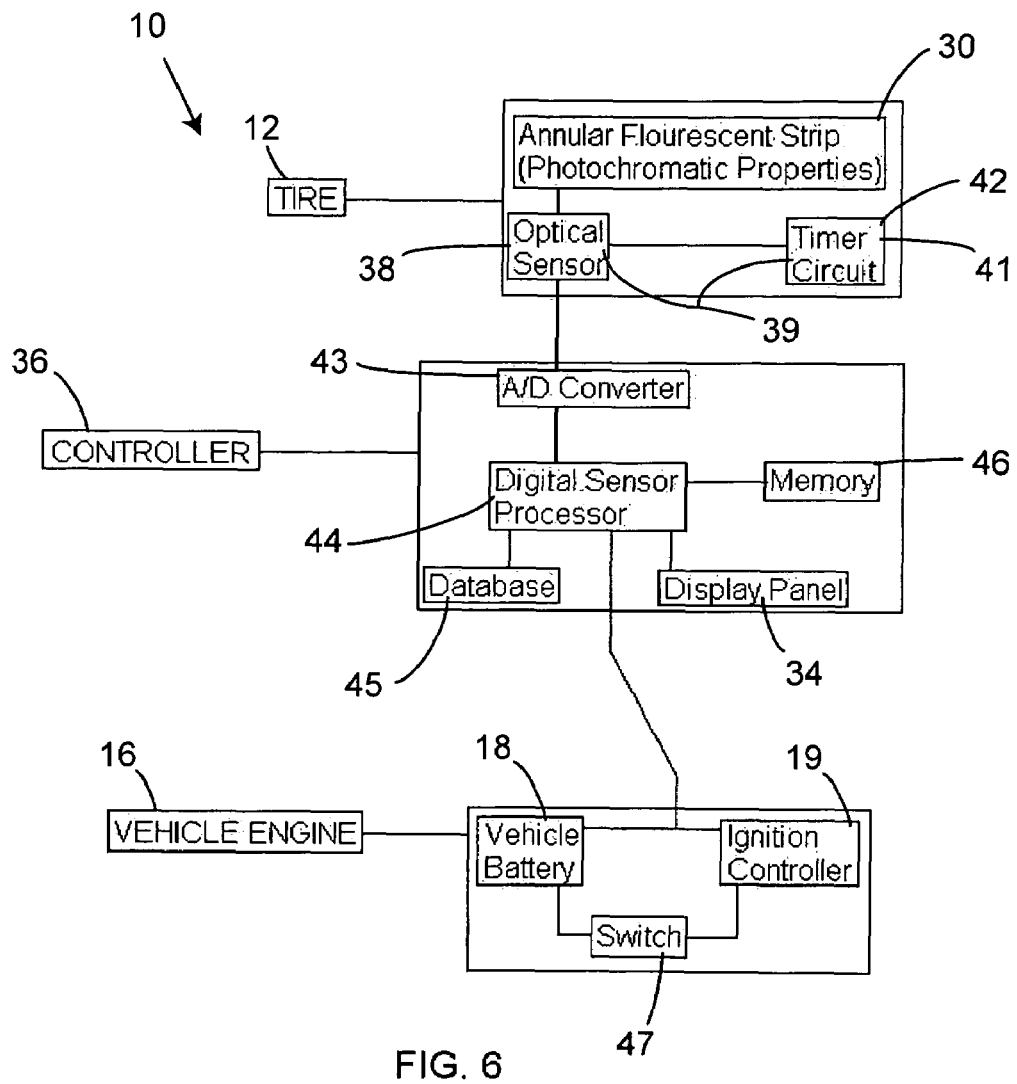
FIG. 6 is a schematic block diagram of the system, in accordance with the present invention.

Referring to FIGS. 3 and 6, the system 10 includes a controller 36 advantageously housed within a compartment of the vehicle 16 and conveniently positioned on a dashboard 15 of the vehicle 16 so that the driver can visually monitor the controller 36. Such a controller 36 conveniently includes a mechanism 37 for determining a remaining tread depth on the vehicle tire 12 based upon the first color of the annular member 30 and the time period. The tread depth determining mechanism 37 is effectively spaced from the vehicle tire 12 and electrically coupled to a battery 18 of the vehicle 16 and an ignition controller 19 of the vehicle 16. The tread depth determining mechanism 37 effectively interrupts power between the vehicle battery 18 and ignition controller 19 respectively, when the annular member 30 has color properties exceeding at least one of a threshold color level and a threshold time period respectively.

Referring to FIGS. 2, 4, 5, and 6, the system includes a convenient color determining mechanism 32 that includes an optical sensor 38 visually and effectively cooperating with the annular member 30. Such an optical sensor 38 is coupled directly to the vehicle tire 12, without the use of intervening elements, and advantageously maintains a direct line of sight with the annular member 30. The optical sensor 38 effectively generates and transmits an analog notification signal based upon a color change of the annular member 30. Such an analog notification signal advantageously has a first data stream that identifies a location of the vehicle tire 12 and a second data stream that identifies the color of the annular member 30.

Again referring to FIGS. 2, 4, 5 and 6, the system also includes a time period determining mechanism 39 that conveniently includes a timer circuit 41 electrically coupled to the optical sensor 38. Such a timer circuit 41 advantageously triggers an internal counter 42 when the first color changes to the second color. The timer circuit 41 effectively generates and transmits a timing data stream to the optical sensor 38.

Referring to FIG. 6, the system still further includes a tread depth determining mechanism 37 that conveniently includes an analog-to-digital converter 43 that effectively receives and converts the analog notification signal to a digital notification signal. A digital signal processor 44 is electrically coupled to such an analog-to-digital converter 43 and receives the digital notification signal. A convenient database 45 contains a table of corresponding tread depths, annular member colors and time periods that correspond to a predetermined model of the vehicle tire 12. A non-volatile memory 46 electrically coupled to the digital signal processor 44 includes software instructions that cause the system 10 to effectively determine the tread depth of the vehicle tire 12 based upon the color of the annular member 30 and the time period associated therewith.

Such software instructions include and calculate a logic algorithm including the steps of: retrieving the first color of the annular member 30; retrieving the time period associated with the first color; if the time period is less than a predetermined threshold time period, locating a tread depth value corresponding to the first color and the time period from the database; and if the time period is greater than the predetermined threshold time period, locating a tread depth value corresponding with the second color and a new time period set to zero.

Again referring to FIG. 6, the system includes a power interrupt switch 47 advantageously seated between the vehicle battery 18 and the ignition controller 19 of the vehicle 16. Such a power interrupt switch 47 is electrically coupled to the digital signal processor 44 and is toggled between open and closed positions when the tread depth falls below the minimum tread depth.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle tire wear notification system for warning a driver of low tread depth on the vehicle tires, said tire wear notification system comprising:

an annular member embedded beneath an outer surface of the vehicle tire, said annular member being disposed beneath a tread layer of the vehicle tire such that said annular member is prohibited from being exposed to ambient light when the tread layer has a predetermined minimum thickness, said annular member having photochromatic properties such that said annular member changes color when exposed to ambient light;

means for determining a color of said annular member, said color determining means being in visual communication with said annular member;

means for determining a time period after which said annular member has transgressed from a first color to a second color; and a controller housed within a compartment of the vehicle and positioned on a dashboard of the vehicle so that the driver can visually monitor said controller, said controller comprising means for determining a remaining tread depth on the vehicle tire based upon said first color of said annular member and said time period, said tread depth determining means being spaced from the vehicle tire and electrically coupled to a battery of the vehicle and an ignition controller of the vehicle;

wherein said tread depth determining means interrupts power between the vehicle battery and the ignition controller respectively when the annular member has color properties exceeding at least one of a threshold color level and a threshold time period respectively.

2. The system of claim 1, wherein said color determining means comprises:

an optical sensor visually cooperating with said annular member, said optical sensor being coupled directly to the vehicle tire and maintaining a direct line of sight with said annular member, said optical sensor generating and transmitting an analog notification signal based upon a color change of said annular member, said analog notification signal having a first data stream identifying a location of the vehicle tire and further having a second data stream identifying the color of said annular member.

3. The system of claim 2, wherein said time period determining means comprises:

a timer circuit electrically coupled to said optical sensor, said timer circuit triggering an internal counter when said first color changes to said second color, said timer circuit generating and transmitting a timing data stream to said optical sensor.

4. A vehicle tire wear notification system for warning a driver of low tread depth on the vehicle tires, said tire wear notification system comprising:

an annular member embedded beneath an outer surface of the vehicle tire, said annular member being disposed beneath a tread layer of the vehicle tire such that said annular member is prohibited from being exposed to ambient light when the tread layer has a predetermined minimum thickness, said annular member having photochromatic properties such that said annular member changes color when exposed to ambient light; wherein said annular member has a single and continuous body extending inside an outer perimeter of the vehicle tire, said annular member being equidistantly spaced from the tread layer and monolithically formed with the vehicle tire;

means for determining a color of said annular member, said color determining means being in visual communication with said annular member;

means for determining a time period after which said annular member has transgressed from a first color to a second color; and a controller housed within a compartment of the vehicle and positioned on a dashboard of the vehicle so that the driver can visually monitor said controller, said controller comprising means for determining a remaining tread depth on the vehicle tire based upon said first color of said annular member and said time period, said tread depth determining means being spaced from the vehicle tire and electrically coupled to a battery of the vehicle and an ignition controller of the vehicle;

wherein said tread depth determining means interrupts power between the vehicle battery and the ignition controller respectively when the annular member has color properties exceeding at least one of a threshold color level and a threshold time period respectively.

5. The system of claim 4, wherein said color determining means comprises:

an optical sensor visually cooperating with said annular member, said optical sensor being coupled directly to the vehicle tire and maintaining a direct line of sight with said annular member, said optical sensor generating and transmitting an analog notification signal based upon a color change of said annular member, said analog notification signal having a first data stream identifying a location of the vehicle tire and further having a second data stream identifying the color of said annular member.

6. The system of claim 5, wherein said time period determining means comprises:

a timer circuit electrically coupled to said optical sensor, said timer circuit triggering an internal counter when said first color changes to said second color, said timer circuit generating and transmitting a timing data stream to said optical sensor.

7. A vehicle tire wear notification system for warning a driver of low tread depth on the vehicle tires, said tire wear notification system comprising:

an annular member embedded beneath an outer surface of the vehicle tire, said annular member being disposed beneath a tread layer of the vehicle tire such that said annular member is prohibited from being exposed to ambient light when the tread layer has a predetermined minimum thickness, said annular member having photochromatic properties such that said annular member changes color when exposed to ambient light; wherein said annular member has a single and continuous body extending inside an outer perimeter of the vehicle tire, said annular member being equidistantly spaced from the tread layer and monolithically formed with the vehicle tire;

means for determining a color of said annular member, said color determining means being in visual communication with said annular member;

means for determining a time period after which said annular member has transgressed from a first color to a second color;

a display screen mounted on the dashboard, said display screen including a graphical user interface that graphically illustrates a location of the vehicle tire as well as a pictorial illustration of said annular member color; and a controller housed within a compartment of the vehicle and positioned on a dashboard of the vehicle so that the driver can visually monitor said controller, said controller comprising means for determining a remaining tread depth on the vehicle tire based upon said first color of said annular member and said time period, said tread depth determining means being spaced from the vehicle tire and electrically coupled to a battery of the vehicle and an ignition controller of the vehicle;

wherein said tread depth determining means interrupts power between the vehicle battery and the ignition controller respectively when the annular member has color properties exceeding at least one of a threshold color level and a threshold time period respectively.

8. The system of claim 7, wherein said color determining means comprises:
    an optical sensor visually cooperating with said annular member, said optical sensor being coupled directly to the vehicle tire and maintaining a direct line of sight with said annular member, said optical sensor generating and transmitting an analog notification signal based upon a color change of said annular member, said analog notification signal having a first data stream identifying a location of the vehicle tire and further having a second data stream identifying the color of said annular member.

9. The system of claim 8, wherein said time period determining means comprises:
    a timer circuit electrically coupled to said optical sensor, said timer circuit triggering an internal counter when said first color changes to said second color, said timer circuit generating and transmitting a timing data stream to said optical sensor.

* * * * *